A. T. DAWSON & G. T. BUCKHAM.
FIREARM.
APPLICATION FILED DEC. 18, 1911.

1,182,983.

Patented May 16, 1916.
9 SHEETS—SHEET 8.

Witnesses:

Inventors:
Arthur Trevor Dawson
& George Thomas Buckham
By Pennie Davis + Goldsborough
Attys.

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

FIREARM.

1,182,983.   Specification of Letters Patent.   Patented May 16, 1916.

Application filed December 18, 1911. Serial No. 636,573.

*To all whom it may concern:*

Be it known that we, ARTHUR TREVOR DAWSON, knight, and GEORGE THOMAS BUCKHAM, subjects of the King of Great Britain, both residing at Vickers House, Broadway, Westminster, in the county of London, England, have invented certain new and useful Improvements in or Relating to Firearms, of which the following is a specification.

This invention relates to fire-arms and particularly to automatic rifles.

The trigger mechanism is of the kind in which the resistance to the movement of the trigger is increased immediately prior to the release of the sear, thereby warning the marksman that the trigger sear is about to release the firing pin, and enabling him to fire the weapon with the minimum amount of movement after taking aim.

The improvements relating to the trigger mechanism consist in providing the trigger bar or sear releasing member with a projection which is so situated in relation to a relatively stationary stop, that after the trigger has been pulled through the greater part of its movement prior to the release of the firing pin, the said projection will meet the said stop whereby considerable resistance will be offered to the final effort of pulling the trigger in releasing the trigger bar from the trigger sear. For this purpose the trigger bar is movably mounted in relation to the trigger and is subject to the influence of a spring which may be interposed between these parts so that during the first part of the pull on the trigger, the spring is energized by the movement of the trigger alone and finally by the combined movement of the trigger and the trigger bar, or the said spring may be otherwise conveniently arranged.

In order to prevent the weapon from being accidentally discharged, we may provide a safety grip lever which is normally adapted to coöperate with the trigger and with the sear to restrain these parts from moving. When the said lever is actuated in grasping the weapon, it is displaced into such a position that the trigger and the sear are rendered free to be moved to fire the weapon by pulling the trigger. We also so construct and arrange the grip lever that it is adapted to engage directly with the breech bolt to retain it retracted when the magazine is being charged, the said lever thus providing improved means for preventing the said bolt from advancing when the magazine platform is depressed in the act of inserting the fresh cartridges.

The rod around which the barrel recoil spring is disposed is provided with a retaining member which is so constructed and arranged that these parts constitute an integral unit which can be assembled in the rifle and removed therefrom without necessitating the dismantling of any of the other important parts of the rifle. For this purpose the said retaining member is movably mounted on the rod and serves as an abutment for one end of the spring, which it retains in its initially compressed condition while in place on the rod, the said retaining member being detachably secured to the barrel for retaining the parts in position and acting as a guide for the rod during the recoil and run out movements of the barrel.

We provide an improved catch device for engaging with the breech bolt to retract it when the rifle is firing as an ordinary hand loading rifle, comprising a longitudinally arranged bar or rod which during automatic firing is normally retained out of engagement with the bolt by a spring contrivance but when so desired can be caused to engage with the said bolt by angularly displacing the bar about a transverse axis or fulcrum. The said longitudinal bar may be slidably mounted on the recoil guide or other convenient non-recoiling part of the rifle and may be provided with a handle carrying the spring contrivance which, by its coöperation with the said recoil guide, causes the aforesaid bar to remain out of engagement with the bolt. The slidable connection between the bar and the fixed part of the rifle is such that the bar can be angularly displaced about the transverse axis or fulcrum by the handle to engage with the bolt against the resistance of the spring contrivance.

The breech action is provided with a spring that serves the double purpose of keeping a retaining pawl in engagement with the bolt when the latter is retracted, and of returning the bolt to the breech closing position when the said pawl is released. For this purpose the bolt retaining pawl is pivotally mounted on the lock and is adapted to coöperate with a longitudinally displaceable releasing device which is under the influence of the bolt return spring, the said releasing device being actuated during the advance of the barrel to disengage the pawl from the bolt.

The sear is combined with the firing pin spring and with a guide rod engaging with the sear, in such a manner that the said sear is normally retained in engagement with the firing pin by the said spring.

We interpose between a recoiling and a non-recoiling portion of the rifle, one or more pneumatic buffer or air cushion devices for the purpose of minimizing the shock of recoil of the barrel. The said pneumatic devices may comprise rearwardly projecting plungers on the barrel or an extension thereof, which plungers at the completion of the recoil movement of the barrel enter corresponding pockets formed in a non-recoiling part of the fire-arm.

The safety catch for preventing the rifle from being discharged accidentally, can be caused to coöperate with the bolt retaining pawl to positively retain the said pawl and sear in their engaging positions. The said safety catch is also of such a character that when shifted into an appropriate position it enables the breech action to be removed intact for repairs or for replacing a breech action.

We provide a single fire catch in the form of a pivoted member which is arranged longitudinally with respect to the barrel, the said member, when in the engaging position, being better adapted to resist the rearward thrust of the barrel than is the case with transversely moving catches. The said member is under the control of an actuating cam or projection directly coöperating therewith and rocked about a transverse axis by a lever or other suitable means.

In order that the said invention may be clearly understood and readily carried into effect we will proceed to describe the same more fully with reference to the accompanying drawings in which:—

Fig. 15 is a section taken approximately on the line 1. 1. of Fig. 13. Fig. 20 is a perspective view of the handle of the catch device. Fig. 21 is a side elevation. Fig. 22 is a partial plan and Fig. 23 a view similar to Fig. 21, showing the coöperation of the catch device with the trigger mechanism. Fig. 24 is a longitudinal section; Fig. 25 is a sectional plan; Fig. 26 a rear elevation and Fig. 27 a section taken approximately on the line 1. 1. of Fig. 24 and viewed from the left, of a constructional form of the breech action, the bolt being shown in the retracted position. Fig. 29 is a longitudinal vertical section of the bolt, and Fig. 30 is an end elevation viewed from the left of Fig. 29. Figs. 31, 32 and 33 are respectively a longitudinal vertical section, an end elevation and a plan of the bolt head. Figs. 34 and 35 are respectively a longitudinal vertical section and an end elevation of the firing pin. Figs. 36 and 37 are respectively a plan and an end elevation of a member hereinafter referred to as the bolt guide. Figs. 38 and 39 are respectively a side and a front elevation of the sear. Figs. 40 and 41 are similar views of the bolt retaining pawl. Figs. 42 and 43 are rear elevations of the safety catch in two different positions hereinafter referred to. Figs. 46 and 47 are respectively a longitudinal section and an end elevation of a detail hereinafter referred to, and Figs. 48 and 49 are respectively a side and an end elevation of another detail.

Figure 1:
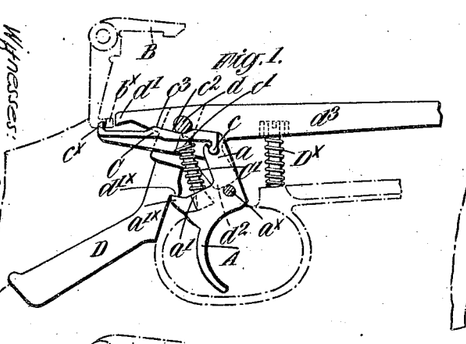
Figure 1 is a diagrammatic side elevation showing one constructional form of the improved trigger mechanism.
Figures 2, 4, 5, 6:
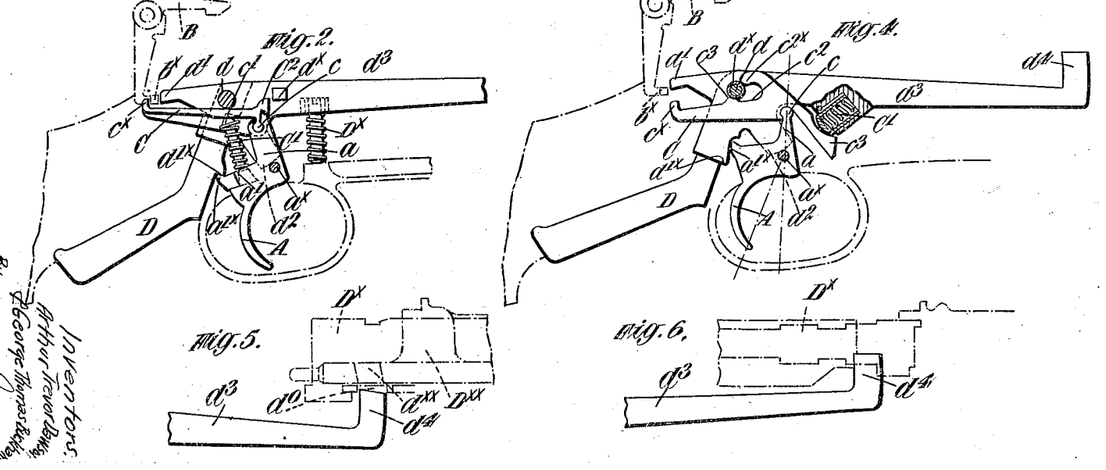
Fig. 2 is a view similar to Fig. 1 of another constructional form of trigger mechanism.
Figs. 3 and 4 are similar views of still another constructional form of trigger mechanism, the parts being respectively in the normal and in the firing position.
Figs. 5 and 6 are fragmental views showing the manner in which the grip lever coöperates with the breech bolt.
Figure 3:
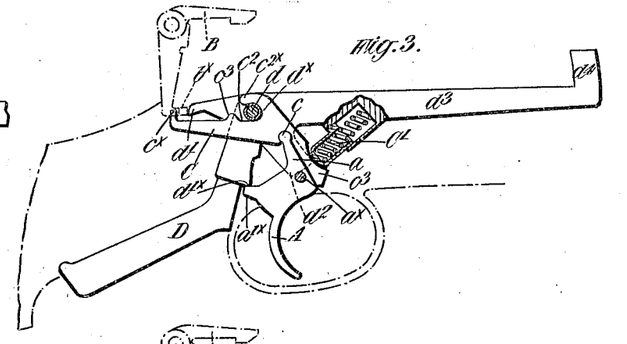

Referring to Figs. 1 to 6, the trigger bar or sear-releasing member C is pivotally and detachably connected at its forward end to an upward extension $a$ of the trigger pull or grip A, this connection being effected in the examples shown in Figs. 1 and 2 by a cylindrical projection $c$ on the trigger bar C which engages in a similarly formed socket at the upper end of the extension $a$ of the trigger pull or grip; in the example shown in Figs. 3 and 4 the extension $a$ is provided with the cylindrical projection and the trigger bar C is formed with the corresponding socket. The trigger bar C is in all the examples horizontally disposed, and its rear end is formed with a toe piece $c^x$ which engages with a bent $b^x$ on the sear B.

Referring more particularly to Fig. 1, the upper part of the trigger bar C is formed with a cam surface constituting the aforesaid projection and is adapted to bear against the aforesaid stationary stop which is shown as being in the form of a cylindrical cross pin $d$, constituting the pivot of the safety grip lever D. The controlling spring C', which is shown as of the helical compression type, is disposed between an approximately horizontal portion $a'$ of the trigger pull or grip A to the rear of its pivot $a^x$, and the underside of the trigger bar C, the connection with the latter being effected by means of a conical centering head $c'$ engaging in a recess in the trigger bar. When the trigger pull or grip A is actuated the trigger bar C is moved longitudinally in a forward direction and during the first part of the movement a substantially flat or slightly depressed part $c^2$ of the cam surface bears against the pin $d$, so that no downward movement of the said bar takes place. During this time the trigger pull or grip A has compressed the spring C', owing to the upward movement of the part $a'$ of the said trigger pull or grip. At a predetermined point in the movement of the trigger pull or grip, that is to say just prior to the release of the sear B, a projection $c^3$ on the cam surface on the trigger bar C coöperates with the pin $d$ and depresses the said bar to further compress the spring C', thereby causing an additional resistance to take place in the actuation of the trigger pull or grip. The firing pin is released at this point by the hooked end of the horizontal arm of the sear B being lifted clear of the bent on the firing pin. The involuntary act of further pulling the trigger pull A causes the trigger bar C to be further depressed and moves the toe-piece $c^x$ out of engagement with the bent $b^x$ on the sear B, and the latter is then free to move under the influence of its spring into such a position as will enable the firing pin to be retained in the cocked position on the discharge and recoil of the weapon. When the trigger pull or grip is released, the spring C' causes the trigger bar C to move rearwardly to assume the position shown in Fig. 1, and the said trigger pull or grip to return to its original or normal position. The aforesaid safety grip lever D is controlled by a spring $D^x$ and is pivotally mounted at $d$ in the stock. The grip portion of the said lever is conveniently disposed so that the hand grasping the stock operates the said grip portion as is well understood. The said lever D is provided with a rearward extension $d'$ which normally coöperates with the bent $b^x$ of the sear B to prevent the latter from moving. The upper part of the grip portion may be formed on its front face with a projection $d'^x$ against which a toe piece $a'^x$ on the trigger pull or grip A normally bears so that the said trigger pull or grip cannot be actuated. The said lever also has a downwardly projecting piece $d^2$ which bears upon the trunnions $a^x$ of the trigger pull A to retain the same in their bearings. When the grip portion of the safety lever D is grasped the latter is angularly displaced about its pivot $d$; the rearward extension $d'$ is thus moved from engagement with the bent $b^x$ of the sear B and the projection $d'^x$ from the toe piece $a'^x$ of the trigger pull or grip A, and the parts can then be actuated to fire the weapon.

In the example shown in Fig. 2, the trigger bar instead of being formed with a cam surface as above stated is provided with a shoulder $C^2$ at its forward part for coöperating with a pin $d^x$ situated some distance from the shoulder so that when the trigger pull or grip A is actuated the said shoulder $C^2$ does not at once come into contact with the pin $d^x$. During this portion of the movement of the trigger pull or grip the spring C' is compressed by the upward movement of the part $a'$ as aforesaid, but when the shoulder $C^2$ comes into contact with the pin $d^x$, the trigger bar C is depressed and the spring is further compressed, thereby giving the increased resistance prior to the release of the sear B as aforesaid.

In the constructional form of the invention shown in Figs. 3 and 4 the controlling spring C' of the trigger mechanism is also adapted to control the aforesaid safety grip lever D, the parts being so arranged that they can all be removed and assembled as one piece. In this construction the spring C' is arranged between a projection $C^3$ on the trigger bar C and a forward extension $d^3$ of the lever D. The said projection $C^2$ on the trigger bar C normally lies against the front face of the trigger pull A as shown in Fig. 3. The fixed part with which the cam surface on the trigger bar C coöperates is a part $d^x$ of the safety lever D through which the axis pin $d$ passes. The said axis pin is held in position with respect to the trigger bar when the latter moves longitudinally, by an extension $c^{2x}$ on the trigger bar C above the said pin, which forms with the flat or depressed portion $c^2$ of the cam surface a slot for the reception of the axis pin, in which it can be angularly displaced when the lever D is rocked by grasping the hand grip portion thereof. When the trigger pull or grip A is actuated the trigger bar C is moved longitudinally as aforesaid, the projection $C^3$ on the trigger bar serving to slightly compress the controlling spring $C'$. When the projecting part $c^3$ of the cam surface of the trigger bar C reaches the part $d^x$ of the safety lever, the said bar is depressed and is rotated about its point of connection with the trigger pull or grip A, thereby causing the controlling spring $C'$ to be compressed an additional amount represented by the movement of the projection $C^3$ on the trigger bar. The parts are then in the position shown in Fig. 4. When the trigger pull or grip A is released, the spring $C'$ causes the parts to assume their normal position ready for the next operation; the said spring also effects the return of the safety lever D to its normal or engaging position.

When the trigger mechanism is employed in an automatic rifle the extension $d^3$ is provided at its forward end with an upward projection $d^4$ which is adapted to engage directly with the breech bolt $D^x$ as shown in Fig. 6 when the cartridge platform is depressed in charging the magazine. The said projection $d^4$ also normally engages in a slot $d^{xx}$ in the barrel extension $D^{xx}$ and in another slot $d^o$ formed in a part of the stationary structure of the rifle. The said projection $d^4$ thus takes any stress to which the safety lever may be subjected by the thrust of the barrel in the event of the rifle sustaining any shock such as occurs when "grounding arms".

When the last cartridge in the magazine has been fired, the breech bolt, as is well known, is prevented from advancing by its engagement with the magazine platform and when the platform is depressed in charging the magazine, the bolt tends to move forward to the firing position. In charging the magazine of a rifle provided with our improvements, the safety lever is allowed to remain in its safety position (Fig. 5) and when the magazine platform is depressed the projection $d^4$ of the said lever arrests the forward movement of the breech bolt $D^x$ as shown in Fig. 6 so that the charging operation can be performed quickly and safely. When the charging is effected, the grip portion D of the safety lever is grasped, and the said lever is rocked as aforesaid to move the projection $d^4$ out of engagement with the breech bolt $D^x$ which then advances to its firing position and pushes the uppermost cartridge into the charge chamber of the barrel.

Figures 7, 8, 9, 10, 11, 12:
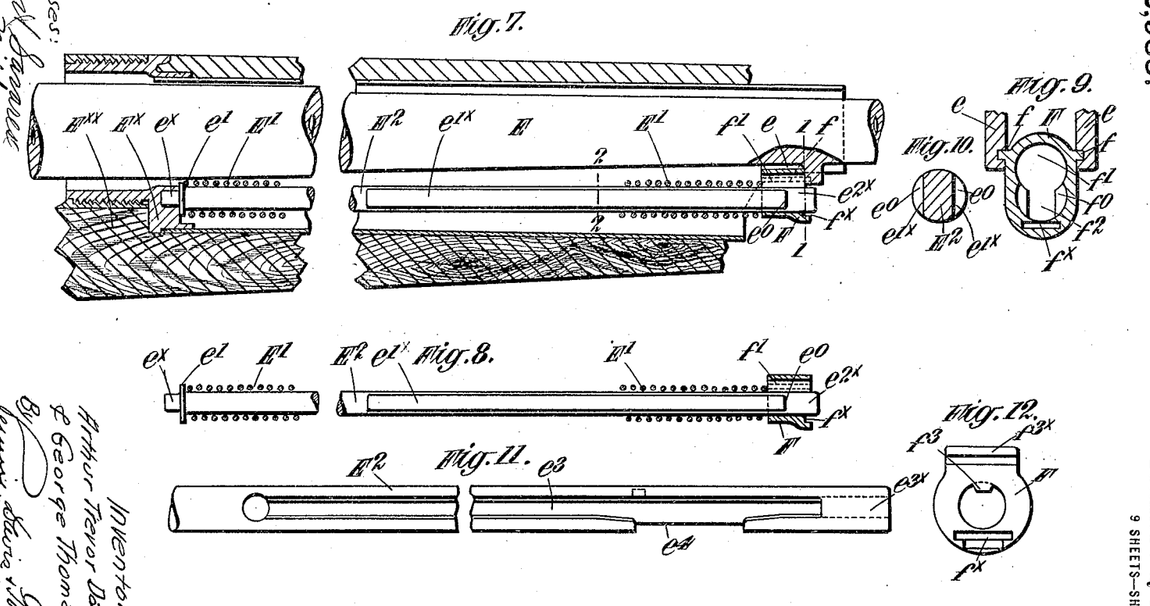
Fig. 7 is a sectional side elevation showing a constructional form of the aforesaid retaining member in position in the rifle.
Fig. 8 is a side elevation of the retaining member, the spring and its rod detached from the rifle.
Fig. 9 is a vertical section on an enlarged scale taken approximately on the line 1—1 of Fig. 7, with the guide rod removed, as seen from the right.
Fig. 10 is a vertical section also on an enlarged scale taken on the line 2—2 of Fig. 7.
Figs. 11 and 12 are respectively a plan of a guide rod and a front elevation of the retaining member showing a modified constructional form thereof.

In the constructional form of retaining member shown in Figs. 7 to 10 of the drawings the said retaining member F is in the form of a collar which is detachably mounted in a lug $e$ on the barrel E by means of keys $f$ on the collar, which engage in corresponding keyways formed in the said lug $e$. One end of the spring rod $E^2$ is adapted to engage in the said collar and the other end is formed with a fixed collar $e'$ against which the spring $E'$ bears and with a spigot $e^x$ that fits in a seating $E^x$ provided in the stock $E^{xx}$ of the rifle. The aperture in the collar F for the reception of the rod is of keyhole formation being composed of a circular hole $f'$ opening at its lower part into a vertical slot $f^2$ (as shown in Fig. 9) whose width is less than the diameter of the said circular hole, the latter being of sufficient diameter to allow the rod $f^2$ to pass through it. The said rod is formed with flat surfaces $e'^x$ on either side for a suitable length near the forward end thereof, to correspond to the vertical slot $f^2$ in the collar F. The forward end $e^{2x}$ of the rod is left cylindrical to fit in a circular enlargement $f^{2x}$ of the front portion of the vertical slot $f^2$ which enlargement forms with the said slot shoulders $f^o$. The flat portions $e'^x$ of the rod during the working of the rifle engage in the vertical slot $f^2$ in the detachable collar F, and the recoil spring E, bears against the rear surface of the said collar. When the spring $E'$ is in position on the rod $E^2$ between the fixed collar $e'$ at one end and the detachable collar F at the other, the shoulders $f^o$ at the forward end of the vertical slot $f^2$ in the said detachable collar bear against the shoulders $e^o$ on the rod $E^2$ formed by the termination of the flat surfaces $e'^x$, and the cylindrical end $e^{2x}$ of the said rod engages in the circular enlargement $f^{2x}$ of the vertical slot. The detachable collar F is thus secured both longitudinally and laterally to the rod $E^2$.

In placing the assembled rod and spring in position in the rifle, the spigot $e^x$ on the rear end of the rod $E^2$ is inserted into its seating $E^x$ in the stock $E^{xx}$ of the rifle. The detachable collar F is then moved rearwardly against the spring $E'$ by suitable means (such for example as the rim of a cartridge engaging in a notch $f^x$ in the front face of the collar) and the rod $E^2$ and spring $E'$ are moved into a position parallel with the axis of the gun so that the spring can cause the keys $f$ on the said collar to engage in the keyways in the lug $e$ on the barrel. The spring $E'$ is then in position in its initially compressed condition. When it is desired to remove the spring and its rod the collar F is displaced rearwardly until the keys $f$ formed thereon move out of engagement with the keyways in the lug $e$. The front portions of the spring $E'$ and rod $E^2$ are then moved in a downward direction until the collar F is clear of the lug $e$; thus rendering the spring and rod free to be moved in a forward direction to withdraw the spigot $e^x$ from its seating. If the spring $E'$ is required to be removed from the rod $E^2$ the collar F is moved rearwardly against the resistance of the spring until the circular enlargement $f^{2x}$ of the vertical slot $f^2$ is out of engagement with the cylindrical end $e^{2x}$ of the rod $E^2$. The collar F is then moved in a downward direction until the circular hole $f'$ therein is in alinement with the rod whereupon the said collar can be removed longitudinally from the rod to permit the spring to be withdrawn.

Referring to Figs. 11 and 12 the retaining member F is in the form of a collar having an internal longitudinal key $f^3$ which is adapted to engage in a keyway $e^3$ formed on the upper surface of the rod $E^2$ and of sufficient length to allow for the full recoil of the barrel. The said collar is provided with an extension or key $f^{3x}$ at its front end to engage in a suitable recess in the lug on the barrel. The underside of the rod $E^2$ is formed with a keyway (shown in dotted lines at $e^{3x}$ in Fig. 11) extending to the forward end of the said rod, the said keyway being joined with the keyway $e^3$ by a circumferential gap $e^4$ of sufficient width to admit the key $f^3$ in the collar F. In placing the collar on the rod, the key $f^3$ is caused to engage with the keyway $e^{3x}$ and the said collar is moved rearwardly against the resistance of the spring (not shown). When the key comes opposite the gap $e^4$, the collar is moved angularly until the key is in line with the keyway $e^3$ and if the collar is now released, the spring will force it forward until the front end of the collar is in contact with the end of the keyway. In assembling the spring, rod and collar in the rifle, the rear end of the rod is placed in its seating and the collar is displaced (preferably by the engagement of the rim of a cartridge with the notch $f^x$) until the extension or key $f^{3x}$ on the collar can engage with its recess in the lug on the barrel, under the influence of the spring.

We wish it to be understood that we do not desire to confine ourselves to the herein described constructional forms of retaining member and guide rod.

Although we have described our invention with reference to the barrel recoil spring, we wish it to be understood that it is applicable to other controlling springs of an automatic rifle.

Figure 13:
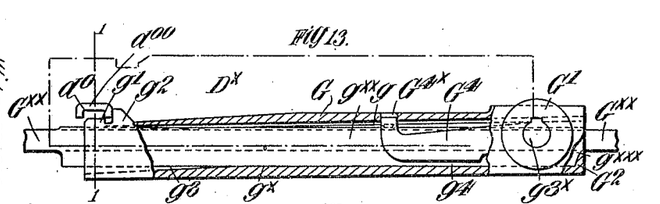
Fig. 13 is a sectional side elevation and Fig. 14 a plan showing a constructional form of our improved catch device in relation to the breech bolt, the said device being in the position it occupies when the rifle is being used automatically.
Figures 14A, 16:
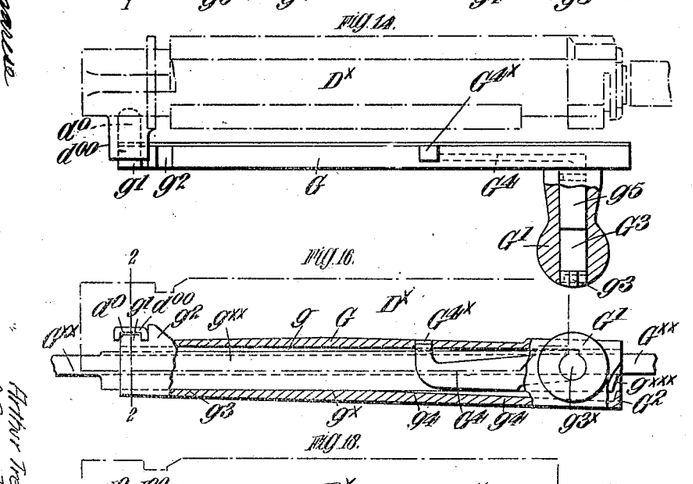
Fig. 16 is a view similar to Fig. 13 showing the catch device in engagement with the firing bolt.
Figures 15, 21:
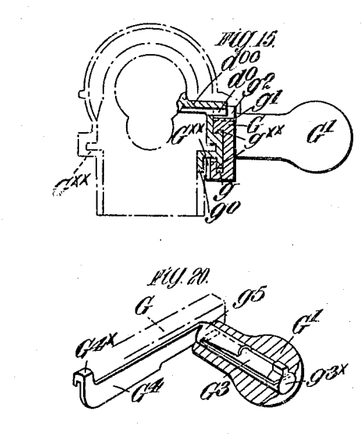
Figure 17:
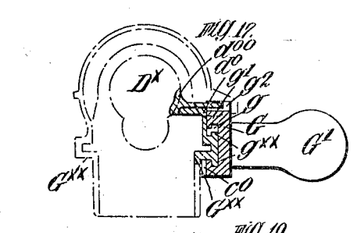
Fig. 17 is a section taken approximately on the line 2. 2. of Fig. 16.
Figure 18:
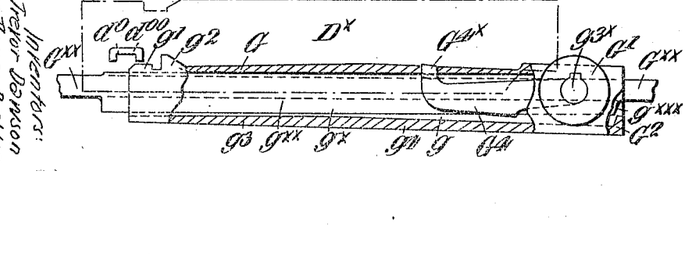
Fig. 18 is a view similar to Figs. 13 and 16 showing the catch device about to engage with the bolt when the latter has not returned to the firing position.
Figure 19:
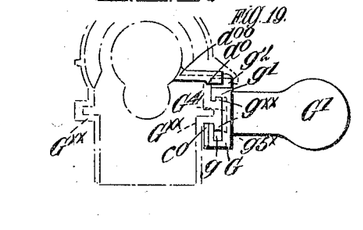
Fig. 19 is an end elevation of Fig. 18.
Figures 21, 22:
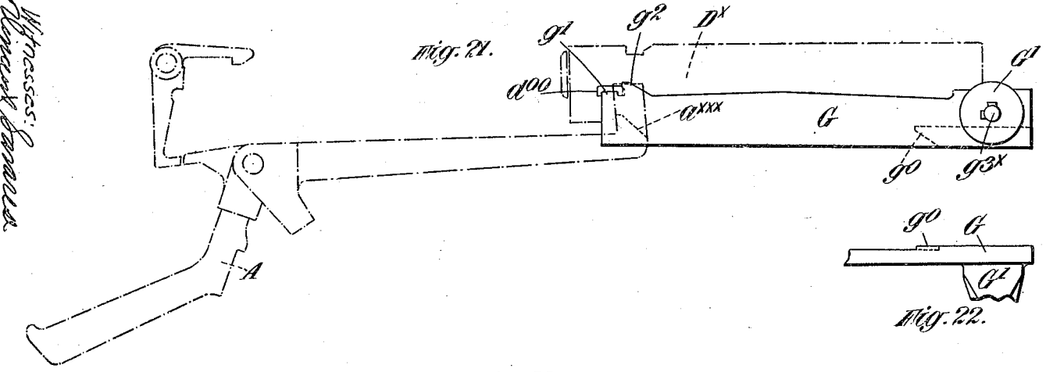
Figure 23:
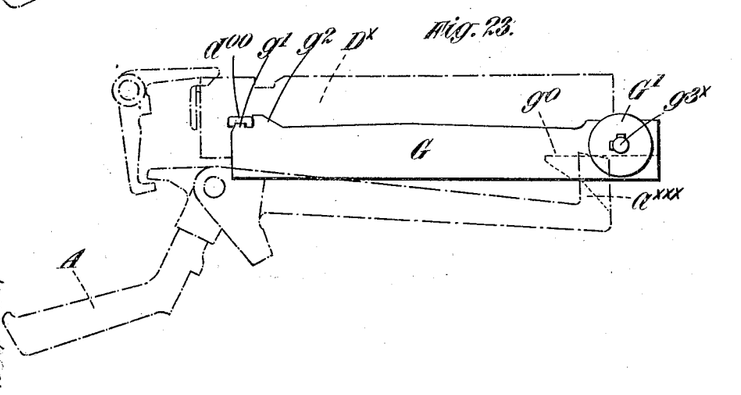

In Figs. 13 to 23 the longitudinally disposed bar or rod G which is arranged outside the casing of the rifle, is rectangular in cross section, and has a T-shaped longitudinal slot $g$ formed therein to engage with corresponding keys $g^{xx}$ on the recoil guide $G^{xx}$ of the rifle the said keys forming a slide on which the bar G reciprocates. The rear end of the said bar is provided on its upper surface with projections $g'$ $g^2$, the former of which is adapted to engage with a pocket $d''$ formed in a lateral extension $d^{00}$ at the rear end of the breech bolt $D^x$. The forward part of the bar G, has rigidly mounted thereon the aforesaid handle $G'$ by means of which the bar is rocked to cause the projection $g'$ on the rear of the bar to engage with the pocket $d''$ in the bolt and through the intervention of which the bar is displaced longitudinally to retract the bolt. The upper part of the longitudinal slot $g$ in the bar is a plane surface but the lower part is composed of two inclined surfaces $g^3$, $g^4$ so that the slot is narrower at the center than at its two extremities, thus forming a slight projection $g^x$ near the center of the bar as clearly shown; the projection serves as a fulcrum about which the bar can be rocked. A toe piece $G^2$ is provided at the forward and lower part of the slot $g$ in the bar G of such a height that the width of the slot at this point is approximately equal to the width of the slide $g^{xx}$. The said toe piece engages with a part $g^{xxx}$ of the slide (as shown in Fig. 13) to prevent the bar G from being reciprocated until it has been angularly displaced and also to prevent angular displacement from that end during reciprocation. The spring contrivance which normally keeps the bar G in the position shown in Figs. 13 to 16 is as aforesaid carried by the handle $G'$ and comprises a flat strip $G^3$ (Fig. 20) of metal constituting a torsion spring, and a lever $G^4$ connected to the said spring. The said lever is arranged longitudinally with respect to the bar G and is formed with a projection $G^{4x}$ at its rear end which engages with the upper surface of the slide $g^{xx}$ as shown in Figs. 13, 16 and 18. The said spring $G^3$ is attached at its outer end to a plug $g^{3x}$ which is arranged in an axial hole formed in the handle, the said plug being detachably retained therein and prevented from being angularly displaced by means of a key and keyway arrangement as clearly shown in Fig. 20. The said spring $G^3$ is detachably secured at its inner end to a lateral boss $g^5$ of the lever $G^4$, the latter being supported when the parts are being assembled by means of a dovetail groove or ledge $g^{5x}$ (Fig. 19) in the sliding bar G. The parts are assembled in such a manner that the spring $G^3$ is in a state of torsion, thereby causing the lever $G^4$ connected therewith to retain the front portion of the sliding bar G in its upper position with the lower inclined surface $g^4$ at the front of the slot $g$ in contact with the under surface of the slide $g^{xx}$ and the projection $g'$ on the rear end of the bar out of contact with the pocket $d^0$ in the firing bolt $D^x$ as shown in Figs. 13 to 15. When it is desired to retract the bolt, for recharging the magazine or otherwise, the handle $G'$ is depressed, thereby rocking the sliding bar G about the fulcrum $g^x$ represented by the junction of the aforesaid two inclined surfaces $g^3$, $g^4$, on the lower part of the slot $g$ in the bar. The projection $g'$ on the rear of the bar then engages with the pocket $d^0$, and the toe piece $G^2$ moves out of contact with the part $g^{xxx}$ into the position shown in Figs. 16 and 17. The bar G together with the bolt $D^x$ can then be moved longitudinally, the bar being guided on the slide $g^{xx}$ by the engagement of the toe piece $G^2$ and the rear inclined surface $g^3$ of the slot $g$ with the under surface of the slide and the front portion of the top surface of the slot $g$ with the upper surface of the said slide. This coöperation of the parts is such that after the bar G has been displaced in retracting the bolt $D^x$ it cannot be moved out of engagement with the said bolt until the bar and the bolt have been returned to the normal position shown in Figs. 13 to 15. If the bolt does not fully return to the firing position owing to a tight fitting cartridge case or otherwise as shown in Fig. 18, the bar G is first rocked as aforesaid and is then moved longitudinally until an inclined portion of the rear of the projection $g'$ meets a similar surface on the forward wall of the pocket $d^0$ and causes the rear end of the bar to become depressed until the whole of the top surface of the slot $g$ is in contact with the upper surface of the slide $g^{xx}$ as shown in Fig. 18 whereupon the said projection reaches the pocket and engages therewith under the action of the spring contrivance. The projection $g'$ is prevented from moving beyond its position of coincidence with the pocket by the second projection $g^2$ striking the forward wall of the pocket. A beveled projection $g^0$ on the forward end of the aforesaid bar is adapted to engage with a similar projection $a^{xxx}$ on the aforesaid safety lever A when the former is drawn back, and has the effect of lifting the rear arm of the safety lever away from the downward arm of the trigger sear thereby rendering the trigger sear free to engage with the flange of the striker. The trigger sear would otherwise jam between the safety lever and the striker flange.

Figures 34, 35, 36, 37, 44, 46:
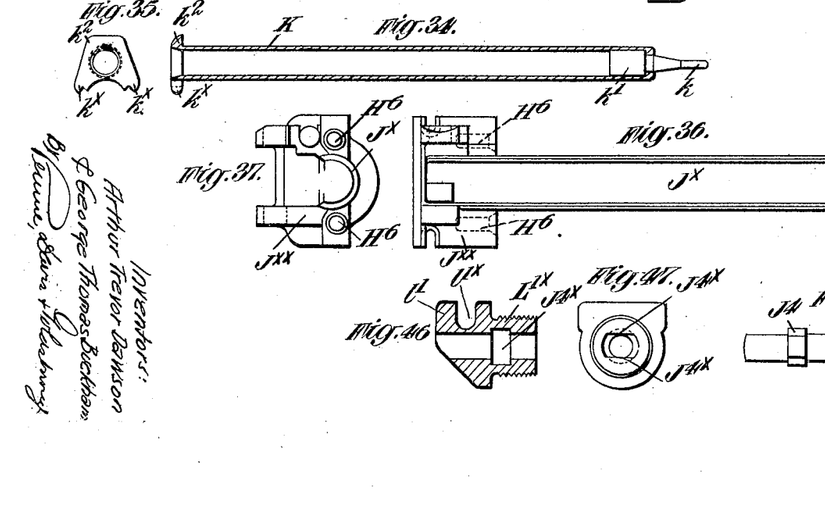
Figure 42:
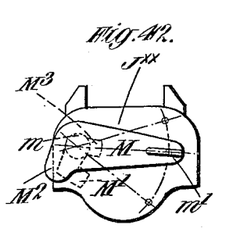

Referring to Figs. 24 to 49 H is the casing inclosing the breech action and H' the cover. $D^x$ is the breech bolt, J' its spring and $J^2$ the bolt retaining pawl. K is the firing pin, K' its spring and B the sear. L represents a constructional form of the aforesaid pawl releasing device. M represents the aforesaid safety catch. The breech action consists of three principal parts, namely the bolt $D^x$, the bolt head $d^4$ that engages with the breech of the rifle, and the bolt guide $J^x$ in which the bolt reciprocates. The bolt has in the example shown two longitudinal holes $j'$, $j^2$ the upper one $j'$ of which is adapted to receive a rearward extension $j^x$ of the bolt head $d^4$, the firing pin K and its helical spring K'. The bolt return spring J' and its parts are disposed in the lower one $j^2$ of the two longitudinal holes. The bolt is formed with keys engaging in key-ways in an extension of the breech piece of the barrel. The bolt head $d^4$ has at its forward end, lugs of the usual kind which engage with corresponding projections on the breech face for locking the bolt to the barrel during firing. The rearward extension $j^x$ of the said bolt head extends practically the full length of the bolt, and is provided near its forward end with two circumferential spiral grooves $j^3$, $j^4$ with which keys $j^{3x}$, $j^{4x}$ formed in the interior of the bolt $D^x$ are adapted to engage to rotate the bolt head $d^4$ for locking and unlocking the latter with respect to the barrel, when relative longitudinal movement takes place between the bolt and the bolt head. The rearward extension $j^x$ of the bolt head $d^4$ is shown of smaller diameter than the forward part, except at the rear where a small portion $j^{xx}$ (Figs. 31, 32 and 33) is of the full diameter in order to retain the bolt head central in the hole $j'$ in the bolt $D^x$. The bolt head $d^4$ is made hollow to receive the firing pin K which as is not unusual is also hollow to receive its spring K'. The striker head $k$ may be either made in one piece with the firing pin or may as shown in Fig. 34, be loosely mounted therein with the forward end of the spring in contact with the rear face of a cylindrical block $k'$; alternatively the striker head may be detachably keyed transversely into the front end of the firing pin, and prevented from being displaced by the bolt head in which the firing pin is disposed. The rear end of the firing pin is provided with a flange $k^2$ with which the sear B is adapted to engage. The said flange also serves to prevent angular displacement of the firing pin by means of two projections $k^x$ (Figs. 34 and 35) engaging with the upper surfaces of the aforesaid bolt guide which is semi-circular in cross section as is clearly shown in Fig. 37.

Figures 30, 32, 38, 39, 40, 41:
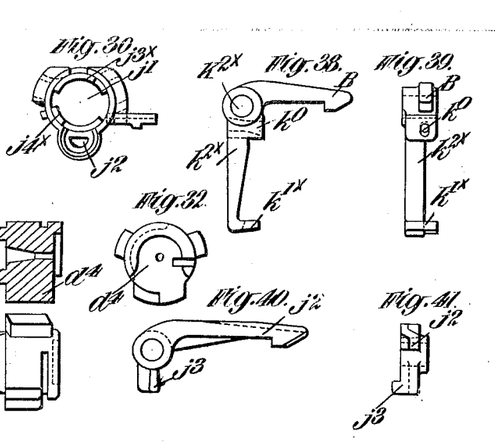

The spring $K'$ of the firing pin surrounds the usual guide rod $K^3$ having a collar $k^3$ at its rear, with which the spring engages. The rear portion of the said guide rod is formed with a spigot $k^{3x}$ engaging in a hole $k^0$ in a depending arm $k^{2x}$ of the sear B which is pivoted at $K^{2x}$ on a vertical back plate $J^{xx}$ of the bolt guide $J^x$. The said hole $k^0$ is, as shown in Figs. 38 and 39 made larger at the front than at the rear, so that when the sear is angularly displaced, the guide rod will not be tilted with it as would occur if the said hole were made throughout its length of the same diameter as the spigot $k^{3x}$. The spring $K'$ by exerting rearward pressure on the guide rod $K^3$ and the depending arm $k^{2x}$ of the sear thus tends to retain the sear in engagement with the aforesaid flange $k^2$ of the firing pin, and also performs its usual function of impelling the firing pin K forward when the sear is released by the trigger bar or sear releasing member (not shown). The pivot $k^{2x}$ on which the sear B is mounted, also carries the bolt retaining pawl $J^2$.

Figures 25, 27:
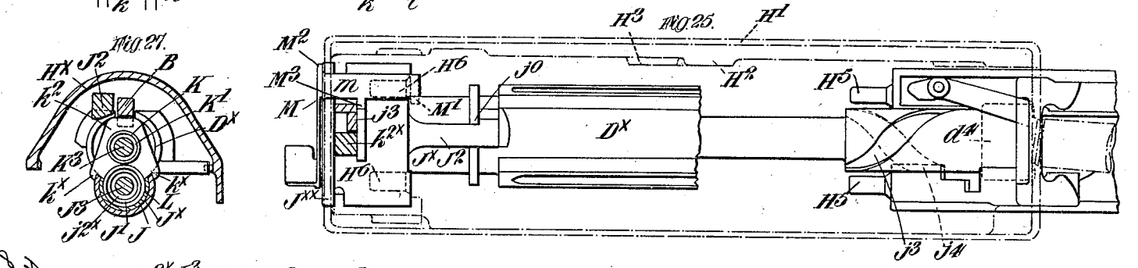
Figure 28:
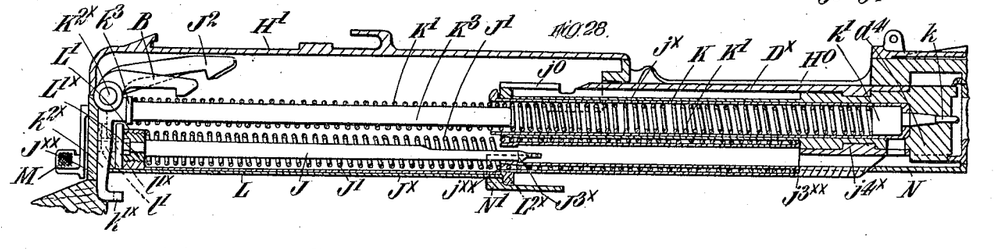
Fig. 28 is a view similar to Fig. 24 with the bolt in the advanced position, and the firing pin in the fired position.

The bolt guide $J^x$ which is as aforesaid of semi-circular cross section is adapted to receive the pawl releasing device L which is in the form of a slide of semi-circular cross section and encircles the lower portion of the bolt $D^x$ shown in Fig. 27. The rear end of the pawl releasing slide L is formed with a lug $L'$ against which the bolt return spring $J'$ bears. The said lug is screw-threaded to receive a collar $L'^x$ having an upward projection $l'$ which is formed with a recess $l'^x$ in which a downwardly projecting arm $j^3$ (Fig. 40) of the bolt retaining pawl $J^2$ engages so that the pressure of the bolt return spring $J'$ is transmitted to the bolt retaining pawl $J^2$ to keep it in engagement with a shoulder $j^0$ of the bolt. The slide L is adapted to be moved in a forward direction and when so moved the pawl $J^2$, owing to the engagement of its arm $j^3$ with the recess $l'^x$, is rocked about its axis $K^{2x}$ and moves out of engagement with the shoulder $j^0$ of the bolt to allow the latter to be returned by its spring. To effect this movement of the slide L, the latter is provided at its forward end with a downward projection $L^2$ which engages with a member $N'$ on an extension of the breech piece N (Fig. 28), so that on the advance movement of the barrel the slide L will be moved in a forward direction to rock the pawl $J^2$ and move it out of engagement with the bolt as shown in Fig. 28.

The bolt return spring $J'$ is so arranged in conjunction with its guide rod $J^3$ and a sleeve $j^{2x}$ that the spring and its parts can be assembled and dismantled intact. In the example shown the spring $J'$, which is of the helical type, surrounds the sleeve $j^{2x}$ which in turn is disposed around the said guide rod $J^3$. The said sleeve formed at its forward end with a circumferential flange $j^{3xx}$ against which the forward end of the spring $J'$ bears. The guide rod is provided at its forward end with a shoulder $J^{3x}$ which is adapted to engage with an internal flange $j^{xx}$ at the rear extremity of the sleeve when the bolt is in the position shown in Fig. 28. The said rod has at its forward end a flat extension $j^{4xx}$ serving as a thumb and finger grip. The rear end of the guide rod $J^3$ has interrupted fillets $J^4$ (Figs. 48 and 49) which fit into corresponding interruptions $J^{4x}$ in the aforesaid collar $L'^x$ of the releasing slide to constitute a species of bayonet joint, for enabling the parts to be connected and disconnected. In assembling the parts prior to their insertion into the breech action the spring $J'$ is slipped over the hollow sleeve $j^{2x}$ and rests against the circumferential flange $j^{3xx}$ at its forward end. The guide rod is passed through the sleeve $j^{2x}$ and during its insertion in the breech action the spring is compressed between the circumferential flange $j^{3xx}$ of the sleeve and the lug $L'$ of the releasing slide L until the rear end of the guide rod protrudes through the rear end of the sleeve. In this position the guide rod is entered into its seating in the collar $L'^x$ of the releasing slide L and turned by means of the flat extension $j^{4xx}$ so that its fillets $J^4$ lock with the interruptions $J^{4x}$. When the spring is compressed, the said flat extension $j^{4xx}$ protrudes through the forward end of the sleeve. On releasing hold of the sleeve the spring $J'$ urges it forward until its inner flange $j^{xx}$ abuts against the shoulder $J^{3x}$ of the guide rod as shown in Fig. 28. As the guide rod $J^3$ is held by the fillets $J^4$ in the collar $L'^x$ of the releasing slide L and the sleeve $j^{2x}$ is held longitudinally by the shoulder $J^{3x}$ of the guide rod, it follows that the spring is restricted in expansion between the circumferential flange $j^{3xx}$ of the sleeve and the lug $L'$ of the releasing slide, thus enabling the guide rod, the releasing slide and the sleeve to be assembled as one unit with the spring in its initially compressed condition. The lock is protected by means of the aforesaid cover $H'$ which extends from the back plate $J^{xx}$ of the bolt guide $J^x$ to the rear end of the magazine opening $H^0$ (Fig. 28) being detachably secured to the recoil guide by the engagement of projections $H^2$ (Fig. 25) on the cover with interruptions $H^3$ on the recoil guides.

The aforesaid buffer or air cushion device for absorbing the shock of recoil of the barrel is in the example shown constituted by two pistons or cylindrical projections H⁵ (Fig. 25) carried by the breech piece in such a position that toward the end of the recoil movement of the barrel, they engage in recesses or pockets H⁶ (Figs. 25, 36 and 37) of corresponding diameter formed in a relatively stationary part of the rifle such as in the example shown the back plate $J^{xx}$ of the bolt guide $J^x$. The compression of the air in the said recesses or pockets H⁶ causes the barrel to be brought to rest without the shock which would otherwise occur. Obviously the relative positions of the cylindrical projections and the recesses might be reversed, the former being carried by the bolt guide and the latter formed in the breech piece.

Figure 43:
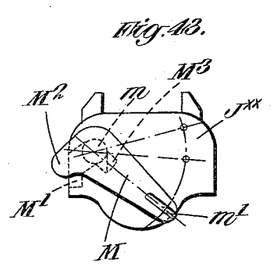
Figure 44:
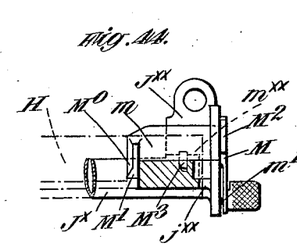
Figs. 44 and 45 are respectively a sectional side elevation and a sectional plan of the safety catch and its coöperating parts, the said catch being in the position shown in Fig. 42.
Figure 45:
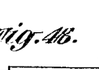
Figure 49:
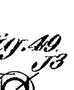

The aforesaid safety catch M (Figs. 42 to 45) comprises in the example shown an external finger piece and a pivot pin $m$ carried by the back plate $J^{xx}$ of the bolt guide. The said safety catch has three projections or arms M′, M², M³. The arm M′ normally engages between a shoulder M⁰ (Figs. 44 and 45) and the front part of the back plate $J^{xx}$ thereby preventing the back plate and the bolt guide $J^x$ from being moved in a forward direction or removed from the back. In order to remove the bolt guide it is moved in a forward direction until gaps $j^{xx}$ in the back plate are brought opposite projections $m^{xx}$ on the recoil guide, and the bolt guide is then lifted. The projection M² normally engages with the rear face of the cover H′ and prevents the latter from moving longitudinally. When the catch is moved into the safety position shown in Figs. 25 and 42 the projection M³ occupies a position in front of the downwardly projecting arm $j^3$ of the bolt retaining pawl J². As this arm is in engagement with the collar $L'^x$ of the releasing slide L the collar of which is pressed in front of the vertical arm $k^{2x}$ of the sear B the said projection M³ on the safety lever restrains any movement of these members and thus renders the rifle incapable of being fired. Figs. 43, 44 and 45 show the catch M in the firing position, the projection M³ being no longer in engagement with the arm $j^3$. When the said lever is moved to the dismantling position shown in Fig. 26, the projection M³ thereon still engages with the downwardly projecting arm $j^3$ of the bolt retaining pawl $j^2$, but the projection M′ moves out of engagement with the recoil guide so that the breech action can be removed together with the safety catch and the back plate $J^{xx}$ that carries it. As the breech action is removed when the various parts are in the cocked position, the sear B and the bolt retaining pawl J² are securely held in engagement with the firing pin K and the bolt $D^x$ respectively, thereby enabling the complete breech action to be readily removed intact. The catch is held in any of its adjusted positions by the engagement of a pin $m'$ on the finger piece in one or other of three holes or depressions in the back plate as is clearly shown in Figs. 42 and 43.

Figures 24, 26:
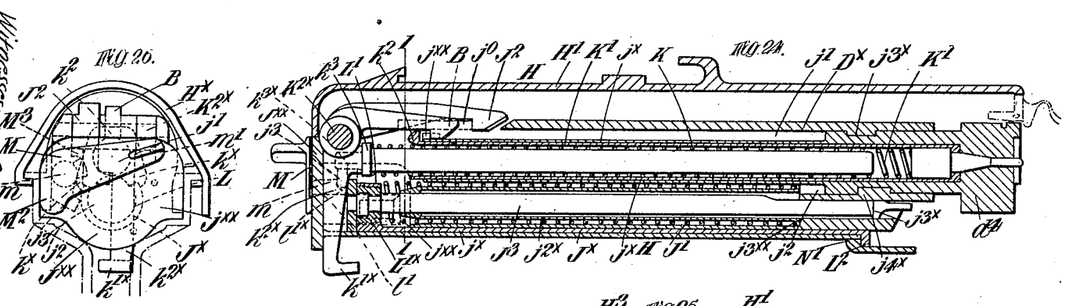

When the barrel recoils on firing it carries with it the bolt $D^x$ and compresses the spring K′ of the firing pin K and the bolt return spring J′, until at the completion of the recoil movement the shoulder $j^0$ of the bolt and the flange $k^2$ of the firing pin are slightly to the rear of the pawl J² and the sear B as shown in Fig. 24. By these means the springs K′ and J′ assist the barrel return spring in the initial forward propulsion of the barrel, until their extension is stopped by the engagement of the shoulder $j^0$ and the flange $k^2$ with the pawl J² and the sear B respectively. On the continued return movement of the barrel under the influence of the barrel return spring E′, the bolt head is carried forward a short distance and is at the same time angularly displaced by means of the aforesaid spiral keys $j^{3x}$, $j^{4x}$ on the bolt $D^x$, and the keyways $j^3$, $j^4$ on the bolt head, thereby liberating the bolt head from engagement with the barrel extension. By the continued forward movement of the barrel while the bolt is held retracted by the retaining pawl J², the spent cartridge case is ejected, and a new cartridge is raised from the magazine in front of the bolt head by the magazine spring. As the barrel completes its forward movement the member N′ on the barrel extension engages with the downward projection $L^{2x}$ of the releasing slide L, thereby causing the latter to move the bolt retaining pawl J² out of engagement with the bolt, and allowing the latter to be urged forward by its spring J′ to close the breech, the cartridge in front of the bolt being driven into the cartridge chamber by the bolt head. Immediately the bolt head is arrested by the end of the barrel, its projections or locking lugs are free of the longitudinal keyways in the breech piece and further movement of the bolt rotates the bolt head by means of the aforesaid spiral keyways and keys and brings its lugs behind the projections of the breech face, thus locking the bolt to the barrel. The firing pin K is still retained in the cocked position by the sear B and the rifle can be fired when desired by pressing the trigger to release the said sear from engagement with the firing pin, after which the aforesaid cycle of operations is repeated.

Figure 50:
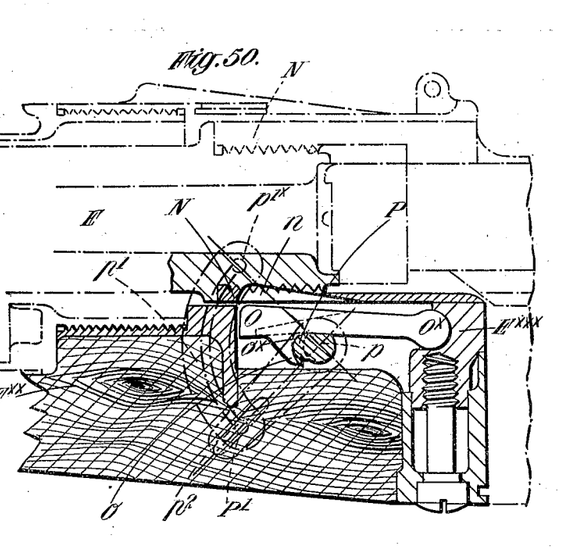
Figs. 50 and 51 are sectional elevations showing the improved single fire catch in the disengaged and engaged position respectively.
Figure 51:
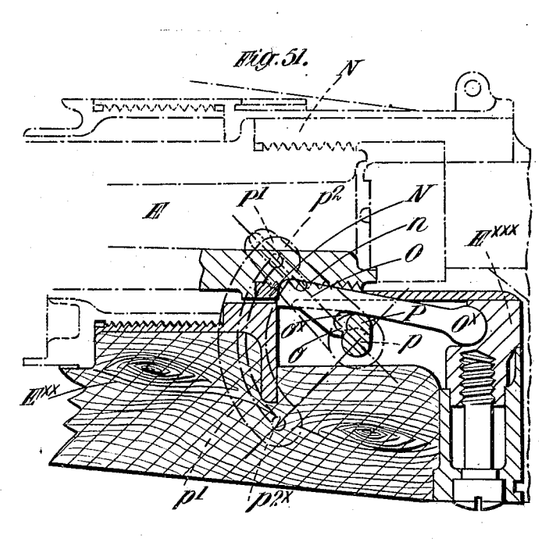
Figure 52:
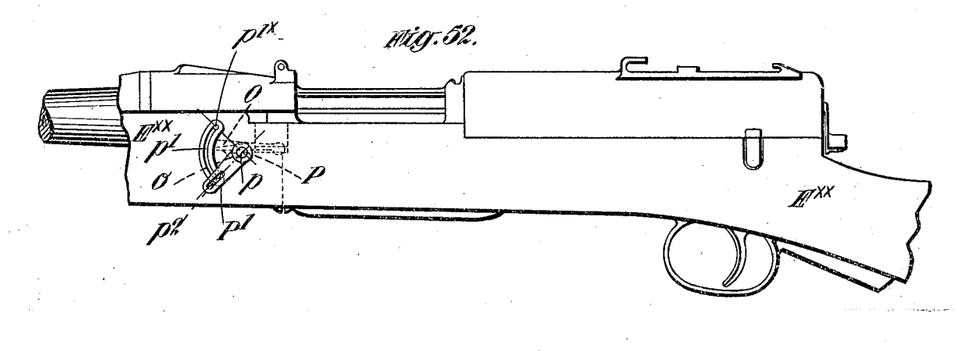
Fig. 52 is a general side elevation of a portion of a rifle, showing more clearly the position of the said catch thereon.
Figure 53:
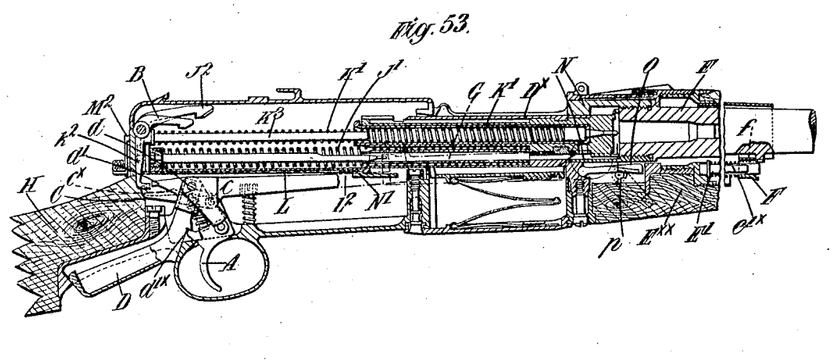
Fig. 53 is a vertical longitudinal section of the rifle showing our improvements.

Referring to Figs. 50 to 52, the catch O is pivotally mounted by means of a cylindrical head $O^x$ engaging in a similarly shaped recess in a part $E^{xxx}$ of the recoil guides and it is arranged in an approximately horizontal position beneath the barrel extension N. This barrel extension has a recess $n$ on its underside in which the forward or free end of the catch is adapted to engage when in the operative or "single fire" position shown in Fig. 51. In this position of the catch, the barrel is prevented from recoiling and the rifle is adapted for use as an ordinary hand loading rifle. The lower surface of the catch O is provided with a hook shaped extension $o$ forming a recess $o^x$. The actuating member P is constituted by a cam or projection which is adapted to engage with the said recess $o^x$ the said cam or projection forming part of a transverse spindle $p$ that terminates at one end in a resilient lever P′. This lever, which is shown as being situated on the left side of the rifle, is adapted to move over a quadrant $p'$ that has holes $p'^x$ $p^{2x}$, one or other of which receives a pin $p^2$ on the said lever P′ to retain the latter in the "single fire" position shown in Fig. 51 or in the "automatic" position shown in Fig. 50. The resiliency of the said lever permits the pin $p^2$ to snap into engagement with either of the said holes. It will be obvious that when the lever P′ is moved from one position to the other, the aforesaid cam or projection P bears against the underside of the catch O or engages with the hook shaped projection $o$ thereon, according to the direction of movement, thus causing the said catch to move into or out of engagement with the recess $n$ in the barrel extension and retaining it in either of these positions. The said cam or projection is held in either of its displaced positions by the engagement of the aforesaid pin $p^2$ on the resilient lever P′ with one or other of the holes in the quadrant $p'$. We may use instead of the said resilient lever a milled head in which may be placed a small spring catch, the latter engaging with recesses on the rifle to retain the milled head in the "single fire" or "automatic" position. We do not desire to confine ourselves to either of the specific means described for operating the cam or actuating member as any appropriate contrivance may be employed for that purpose.

What we claim and desire to secure by Letters Patent of the United States is:—

1. In a firearm, the combination with the trigger and the sear releasing member, of a spring controlling said trigger and member, a projection on said member, and a relatively stationary stop with which said projection coöperates to increase the resistance of the spring to the movement of the trigger just before the firing pin is released.

2. In a firearm, the combination with the trigger and the sear releasing member, of a helical spring controlling said trigger and member, a projection on said member, and a relatively stationary stop with which said projection coöperates just before the firing pin is released, to compress the spring an additional amount to that imparted to it by the movement of the trigger.

3. In a firearm, the combination with the trigger, the sear, the sear releasing member, and the safety grip lever that normally coöperates with the trigger and the sear, of a spring controlling said trigger and member, a projection on said member and a stop on said lever with which said projection coöperates just before the firing pin is released, to compress the spring an additional amount to that imparted to it by the movement of the trigger.

4. In a firearm, the combination with the breech bolt, of a spring controlled grip lever, and a projection thereon that coöperates directly with said bolt to hold it retracted when the magazine is being charged.

5. In an automatic firearm, the combination with the barrel extension and the breech bolt, of a spring controlled safety grip device, means thereon for coöperating directly with said extension to hold the barrel in its forward position, and means thereon for coöperating directly with the bolt to hold it retracted when the magazine is being charged.

6. In an automatic firearm, the combination with the stationary structure thereof and the barrel extension, of a spring controlled grip lever, an extension thereon that engages in slots in said structure and extension, and a projection on said lever that coöperates directly with said bolt to hold it retracted when the magazine is being charged.

7. In an automatic firearm, the combination with the trigger, the sear, the breech bolt and the barrel extension, of a spring controlled grip lever, projections thereon for engaging with the trigger and sear, and a further projection that engages with the breech bolt and with the barrel extension.

8. In an automatic firearm, the combination with the barrel spring and the rod around which the spring is disposed, of a retaining member that serves to cause these parts to constitute an integral unit which can be assembled in the firearm and removed therefrom without necessitating the dismantling of any other important parts.

9. In an automatic firearm, the combination with the barrel, the barrel spring and the rod around which the spring is disposed, of a collar forming an abutment for one end of said spring, and means for detachably connecting said collar to the barrel.

10. In an automatic firearm, the combination with the barrel, the barrel spring and the rod around which the spring is disposed, of a collar forming an abutment for one end of said spring, means for detachably connecting said collar to the barrel, and means for loosely connecting the collar to said rod.

11. In an automatic firearm, the combination with the breech bolt, of a longitudinally arranged bar slidably carried by the structure of the firearm, a spring for normally holding said bar out of engagement with the bolt, and means for rocking said bar about a transverse axis to engage with said bolt, and for displacing said bar longitudinally to move the bolt.

12. In an automatic firearm, the combination with the breech bolt, of a longitudinally arranged bar slidably carried by the structure of the firearm, a handle for rocking said bar about a transverse axis to engage with said bolt, and for displacing said bar longitudinally to move the bolt, and a spring contrivance carried by said handle for normally holding said bar out of engagement with said bolt.

13. In an automatic firearm, the combination with the recoil guide, and the breech bolt, of a longitudinally arranged bar carried by said guide, a handle for rocking said bar about a transverse axis to engage with said bolt, and for displacing said bar longitudinally to move the bolt, and a spring contrivance carried by said handle and engaging with said guide for normally holding said bar out of engagement with said bolt.

14. In an automatic firearm, the combination with the recoil guide and the breech bolt, of a slide on the side of said guide, a longitudinally arranged bar having a slot engaging with said slide, a spring for normally holding said bar out of engagement with the bolt, a handle for rocking said bar about a transverse axis into engagement with said bolt and for longitudinally moving said bar, and a projection on the lower wall of said slot formed by the junction of two inclined surfaces and constituting the fulcrum about which said bar is rocked by said handle.

15. In an automatic firearm, the combination with the recoil guide and the breech bolt, of a slide on the side of the said guide, a longitudinally arranged bar having a slot engaging with said slide, a spring for normally holding said bar out of engagement with the bolt, a handle for rocking said bar about a transverse axis into engagement with said bolt and for longitudinally moving said bar, a projection on the lower wall of said slot formed by the junction of two inclined surfaces and constituting the fulcrum about which said bar is rocked by said handle, and a toe piece forming a termination to the lower forward wall of said slot and serving to engage with a portion of the slide on the recoil guide to prevent said bar from being displaced longitudinally until it has been rocked and to engage with the under surface of the said slide during the longitudinal movement of the bar.

16. In an automatic firearm, the combination with the breech bolt, its retaining pawl and spring, of means whereby said spring acts both to return the bolt to the breech closing position and to normally retain the pawl in engagement with the bolt.

17. In an automatic firearm, the combination with the breech bolt and its retaining pawl, of a member connected to said pawl, a spring operating upon said member to hold the pawl in engagement with the bolt, and upon said bolt for returning it to the breech closing position.

18. In an automatic firearm, the combination with the breech piece, the breech bolt and its retaining pawl, of a sliding member connected to said pawl, a spring bearing at one end upon said member and at the other end upon the bolt, and an extension on said breech piece for engaging with said member to move the pawl and release the bolt during the advance movement of the barrel.

19. In an automatic firearm, the combination with the barrel extension, the breech bolt and its retaining pawl, of a sliding member connected to said pawl, a bolt spring and its guide rod, a loose sleeve surrounding said rod, a collar on said sleeve, a projection on said member, said spring being disposed between said collar and projection, and an extension on said barrel extension for engaging with said member to move the pawl and release the bolt during the advance movement of the barrel.

20. In an automatic firearm, the combination with the barrel extension, the breech bolt and its retaining pawl, of a sliding member connected to said pawl, a bolt spring and its guide rod, a loose sleeve surrounding said rod, a collar on said sleeve, a projection on said member, said spring being disposed between said collar and projection, an extension on said barrel extension for engaging with said member to move the pawl and release the bolt during the advance movement of the barrel, and a slot in said projection for receiving a part of said pawl.

21. In a firearm, the combination with the firing pin, its spring and sear, and the guide rod of said spring, of a collar on said rod against which the spring bears, and a projection on said rod engaging a recess in the sear to enable the pressure of the spring to normally retain the sear in engagement with the firing pin.

22. In a firearm, the combination with the firing pin, its spring, and sear, and the guide rod of said spring, of a collar on said rod against which the spring bears, a downwardly projecting arm on said sear, and a projection on said rod engaging in a recess in the said downwardly projecting arm.

23. In an automatic firearm, the combination with the recoiling barrel, and an extension thereof, of two rearwardly projecting plungers, one arranged on each side of the barrel axis, adapted to enter corresponding pockets in a non-recoiling part of the firearm during the recoil of the barrel.

24. In an automatic firearm, the combination with the sliding cover, the recoil guide, the breech bolt and the bolt retaining pawl, of a catch device, a projection thereon for engaging with said cover, a second projection for engaging with said pawl, and a third projection for engaging with the recoil guide.

25. In an automatic firearm, the combination with the recoiling barrel, of a longitudinally arranged catch adapted to engage therewith, and manually operated means for rocking said catch about an axis transverse to the axis of the barrel.

26. In an automatic firearm, the combination with the recoiling barrel, of a longitudinally arranged catch adapted to engage therewith, and a manually operated member for positively moving said catch about an axis transverse to the axis of the barrel into and out of engagement with the barrel.

27. In an automatic firearm, the combination with the recoiling barrel, of a longitudinally arranged catch adapted to engage therewith, and a manually operated member for positively moving said catch about an axis transverse to the axis of the barrel into and out of engagement with the barrel, and for positively holding it at either extremity of its movement.

28. In an automatic firearm, the combination with the recoiling barrel, of a longitudinally arranged catch adapted to engage with the barrel, means for pivotally mounting said catch transversely to the barrel, a hook-shaped projection on said catch, a cam for engaging in the recess between said projection and the under surface of the catch, and means for manually displacing said cam.

In testimony whereof we affix our signatures in presence of two witnesses.

ARTHUR TREVOR DAWSON.
GEORGE THOMAS BUCKHAM.

Witnesses:
HENRY KING,
JNO. R. CASWELL.

Copies of this patent may be obtained for five cents each, by addressing the "Commissioner of Patents, Washington, D. C."